Patented Oct. 4, 1932

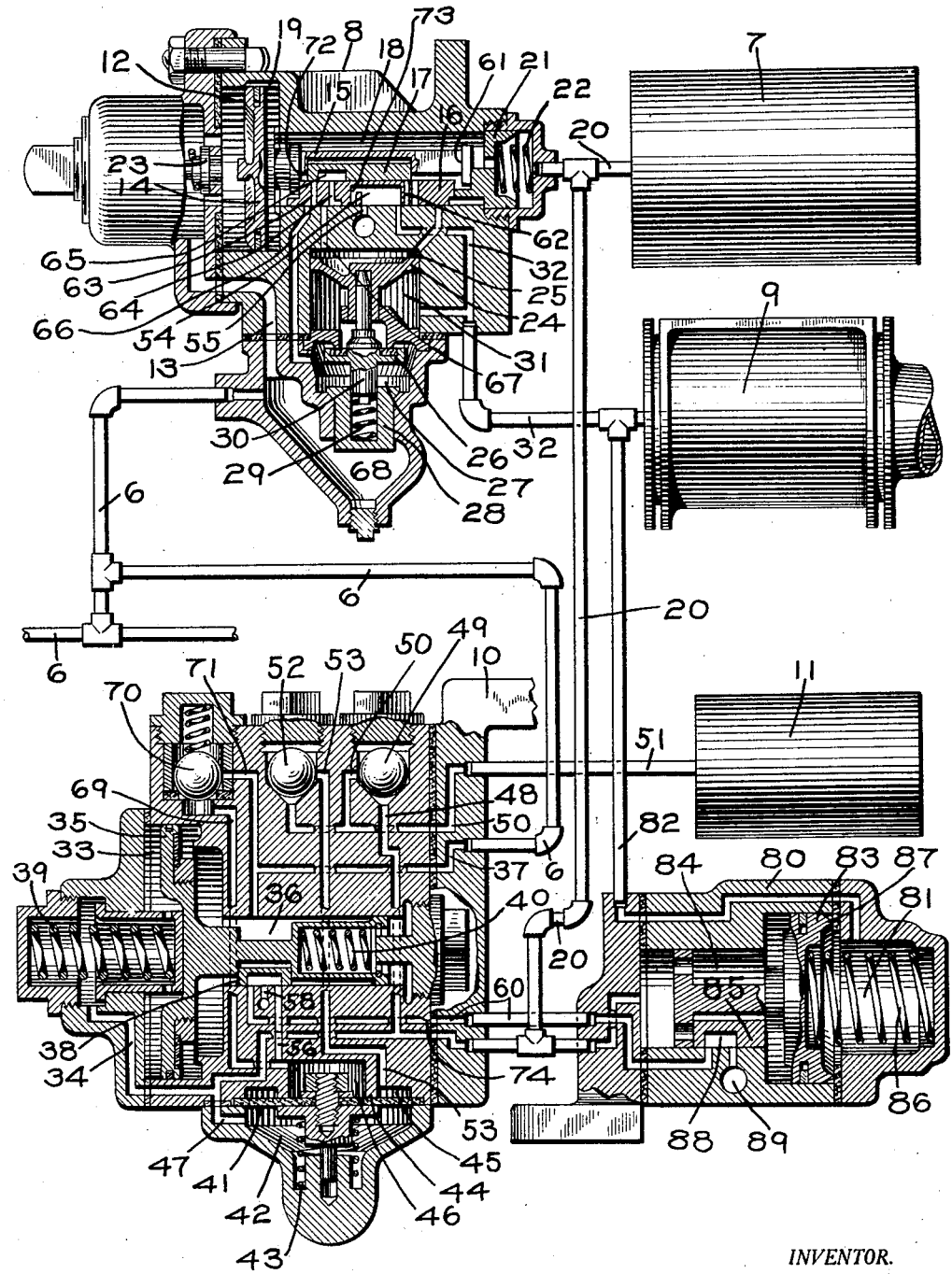

1,881,209

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed August 22, 1930. Serial No. 477,077.

This invention relates to fluid pressure brakes, and more particularly to a brake equipment in which the brakes are applied by effecting a reduction in brake pipe pressure and are released by increasing the brake pipe pressure.

On long trains, it is difficult to apply and release the brakes without causing excessive shocks, due to the running in of the slack before the brakes are applied on the rear cars of the train and the running out of the slack before the brakes are released on the rear cars.

In actual service, difficulty is encountered in causing all brakes to apply on long trains because of the slow rate of brake pipe reduction, due to the auxiliary reservoirs of the brake equipments discharging fluid into the brake pipe through the feed grooves, so that excessively heavy reductions in brake pipe pressure must be made to insure that all brakes will apply, especially when brake pipe leakage is of a minimum amount. Consequently, shocks are encountered not only because of the slow serial application of the brakes, but also because they apply nonuniformly in degree of braking force. Furthermore, difficulty in releasing the brakes is experienced, because the brake pipe pressure, when restored entirely from the locomotive, increases so slowly that leakage past the triple valve packing rings causes equalization of pressure on the triple valve pistons and a resultant failure of the brakes to release.

The principal object of my invention is to provide a brake equipment by which the brakes can be applied and released on a long train with certainty and without causing excessive shocks.

According to one feature of my invention, the venting of fluid from the brake pipe to effect quick serial action (commonly known as quick service) in a service application of the brakes, is controlled by a valve device separate from the triple valve device, and subject to the opposing pressures of the auxiliary reservoir and the brake pipe and adapted to respond to a differential of pressures less than the differential required to move the main slide valve of the triple valve device to application position.

According to my invention, the valve device for causing quick service is controlled by the operation of the triple valve device in venting fluid from the auxiliary reservoir to the brake cylinder, so that the quick service valve device is moved to lap position when the auxiliary reservoir pressure is reduced toward approximately equality with the brake pipe by operation of the triple valve device, and this permits the use of a relatively large port and through which fluid is vented from the brake pipe, so that a large quantity of fluid from the brake pipe can quickly pass through it, since the degree of local reduction in brake pipe pressure is limited to that approximately necessary to cause the triple valve device to apply the brakes, and an over reduction in brake pipe pressure is prevented, as would be the case with the usual triple valve device, were a large quick service port to be employed.

With my improved apparatus, fluid under pressure is vented from the brake pipe to the atmosphere, so that a continuous and rapid venting of fluid from the brake pipe will occur, so long as the quick service valve device remains in its brake pipe venting position. Although fluid is vented from the brake pipe to the atmosphere, an over reduction in brake pipe pressure is prevented, since, as before stated, the degree of local reduction is limited to that necessary to cause the triple valve parts to move so as to apply the brakes.

A spring is employed to cause the quick and positive movement of the quick service valve device to lap position, so as to assure the prompt cutting off the venting of fluid from the brake pipe, as the brake pipe and auxiliary reservoir pressures approach equalization.

The quick service valve device moves with a minimum of frictional resistance, so that the differential of fluid pressures required to move the valve device may be fixed by springs.

In order to ensure that the brake pipe pressure will be restored after an emergency application of the brakes, or after an over reduction in brake pipe pressure, according to one feature of my invention, a cut-off valve device is provided which is adapted to cut off communication from the brake pipe to the atmospheric vent, when the brake pipe pressure has been reduced sufficiently to permit the equalization of the auxiliary reservoir into the brake cylinder.

According to my invention, the release is accelerated serially throughout the train, by venting fluid from a normally charged reservoir on each vehicle to the brake pipe, the accelerated release being also controlled by the quick service valve device.

Other objects and advantages will appear in the following more detailed description of the invention.

In the accompanying drawing, the single figure is a diagrammatic view, mostly in section, of a fluid pressure brake equipment embodying the invention.

Referring to the drawing, the equipment may comprise a brake pipe 6, auxiliary reservoir 7, triple valve device 8, brake cylinder 9, quick service valve device 10, and serial release reservoir 11.

The triple valve device 8 may be of well known construction and comprises a casing having a chamber 12 connected to the brake pipe 6, through a passage 13 and containing a piston 14 having a stem 15 adapted to operatively engage a main slide valve 16 and an auxiliary slide valve 17 contained in a chamber 18 connected to the piston chamber 12 through the usual feed groove 19 around the piston 14 and also connected to the auxiliary reservoir 7 through a pipe 20. Also contained in the valve chamber 18 is a retarded release stop 21 which is subject to the pressure of a spring 22 and which is adapted to be engaged by the end of the piston stem 15. Contained in the piston chamber 12 is the usual spring-pressed graduation stem 23 with which the piston 14 is adapted to engage.

The triple valve device 8 also comprises a quick action piston 24 contained in a chamber 25 and adapted to operate a quick action valve 26 contained in a chamber 27. Also contained in the chamber 27, is a check valve 28 having a central bore containing a spring 29 with which a projection 30, on the valve 26, cooperates. The chamber 31 at one side of the quick action piston 24 is connected to the brake cylinder 9, through a passage and pipe 32. Passage 32 also leads to the seat of the main slide valve 16.

The quick service valve device 10 may comprise a casing having a piston chamber 33, connected through a passage 34 with the auxiliary reservoir pipe 20 and containing a piston 35 and having a valve chamber 36, connected through a passage 37 with the brake pipe 6 and containing a slide valve 38, adapted to be operated by piston 35.

On one side of the piston 35 there is a spring stop 39, while on the opposite side of said piston there is a spring stop 40, which is mounted in the valve chamber 36 and engages the end of the piston stem. The construction is such that when the device is in release position, as shown in the drawing, the piston 35 is held between the spring stops 39 and 40, and movement of the piston in either direction is opposed thereby.

Also mounted in the casing of the quick service valve device 10, is a flexible diaphragm 41, having at one side a chamber 42 containing a spring 43 which urges said diaphragm into engagement with a seat rib 44 at the opposite side of the diaphragm, said seat rib separating an annular chamber 45 from a chamber 46 when the diaphragm is seated.

In operation, when the brake pipe 6 is charged with fluid under pressure in the usual manner, fluid flows from the brake pipe through passage 13 to piston chamber 12 of the triple valve device 8 and shifts the piston 14 to release position, as shown in the drawing.

Fluid then flows from the piston chamber 12, through the feed groove 19 to valve chamber 18, and from valve chamber 18 through pipe 20 to the auxiliary reservoir 7, thus charging the auxiliary reservoir 7, and the valve chamber 18.

Fluid also flows from the pipe 20, through passage 34 to the piston chamber 33 of the quick service valve device 10. Since the diaphragm chamber 42 is connected to the passage 34 by passage 47, fluid also flows to the chamber 42. Fluid also flows to the serial release reservoir 11 from passage 34, through passage 48, past ball check valve 49, passage 50, and pipe 51. From passage 50, fluid flows past ball check valve 52 and through passage 53, to the annular chamber 45.

It will thus be noted that when the piston 14 of the triple valve device 8 is in release position, and the auxiliary reservoir 7 is charged with fluid under pressure, piston chamber 33, and diaphragm chambers 42 and 45 of the quick service valve device 10, and the serial release reservoir 11, are also charged with fluid under pressure, as supplied through the auxiliary reservoir pipe 20.

The valve chamber 36 of the quick service valve device 10 is charged with fluid under pressure from the brake pipe 6, through passage 37. Therefore, with the chambers 33 and 36 both charged with fluid under pressure in the manner described above, the piston 35 is held in release position by the spring stops 39 and 40.

With the triple valve device 8 in release position, the brake cylinder 9 is connected to the atmosphere, through pipe and passage 32, cavity 54 in the slide valve 16, and passage 55.

With the quick service valve device 10 in release position, chamber 46 above the diaphragm 41 is connected to atmosphere, through passage 56, cavity 57 in the slide valve 38, and passage 58.

A cut-out valve device is provided comprising a casing 80 having a piston chamber 81, connected to a pipe 82, leading to the brake cylinder pipe 32 and containing a piston 83. At the opposite side of the piston 83 is a valve chamber 84 which is connected to the auxiliary reservoir through pipe 20 and which contains a slide valve 85 adapted to be operated by piston 83. A coil spring 86 in chamber 81, acts on piston 83. When the auxiliary reservoir pressure acting in valve chamber 84 exceeds the brake cylinder pressure acting in piston chamber 81, the piston 83 is maintained in its right hand position, as shown in the drawing, in which the spring 86 is compressed and in which a seat rib 87 on the piston engages a seat, so as to prevent possible leakage from the auxiliary reservoir to the brake cylinder. When in this position, a cavity 88, in slide valve 85, connects pipe and passage 60 to an atmospheric exhaust port 89.

When it is desired to effect a service application of the brakes, the brake pipe pressure is gradually reduced in the usual manner. When the brake pipe pressure has been sufficiently reduced in piston chamber 12 of the triple valve device 8 below that in valve chamber 18 on the other side of piston 14, the higher pressure on the auxiliary reservoir side of the piston 14 is able to overcome the friction of said piston and its attached auxiliary slide valve 17 and move these parts to the left until the shoulder 61 on the end of the piston stem strikes against the right hand end of the main slide valve 16. In this position, the auxiliary slide valve 17 opens the port 62 in the slide valve 16.

In this initial movement, the feed groove 19 is closed, so that back flow from the auxiliary reservoir to the brake pipe is prevented.

Further movement of the piston 14 causes the movement of the main slide valve 16, but this movement requires a sufficient differential of pressures between the auxiliary reservoir and the brake pipe to overcome the frictional resistance of the main slide valve to movement.

The reduction in brake pipe pressure is also effective in the quick service valve device 10, and as soon as the pressure in valve chamber 36 has been sufficiently reduced below that in piston chamber 33 on the other side of the piston 35, the higher pressure on the auxiliary reservoir side of said piston is able to overcome the resistance of the spring stop 40 and move the piston 35 and slide valve 38 to the right. The movement of the slide valve 38 causes the passage 60 to be uncovered, so that fluid under pressure is vented from valve chamber 36 and from the brake pipe 6 to passage 60 and thence through cavity 88 in the slide valve 85 to the atmospheric port 89, thus producing a quick local reduction of pressure in the brake pipe and in the triple valve piston chamber 12.

The area of piston 35 being greater than that of the triple piston 14, and the frictional resistance of the small slide valve 38 being less than that of the main slide valve 16, the piston 35 will move upon a reduction in brake pipe pressure in advance of the movement of the main slide valve 16, for although the light spring 40 acts to prevent movement until the brake pipe pressure has been reduced a definite predetermined amount, the required amount of reduction is light, and just sufficient to ensure that the piston 35 will not move when not desired, due to unavoidable fluctuations in brake pipe pressure, in other words, the spring 40 acts to stabilize the operation of the quick service valve device.

It should be noted that the flow area past the choke 74 in passage 60, is relatively large, so that a relatively rapid rate of flow of fluid from the brake pipe to the atmosphere is obtained. A large port can be used with my invention, since the degree of local reduction in brake pipe pressure is normally determined by the movement of the triple valve piston to lap position. Furthermore, the quick service port can be made larger than with the existing bulb type quick service devices, because the transmission time is so short that difficulty is not experienced from the surging of fluid in the brake pipe.

Due to the action of the quick service valve device 10 above described, the brake pipe pressure in piston chamber 12 of the triple valve device 8 is quickly reduced, so that the higher pressure on the auxiliary reservoir side of piston 14 is able to overcome the resistance of the main slide valve 16, and the movement of the piston 14 and slide valve 16 to the left is assured.

The movement of the main slide valve 16 closes the connection between the passage 32 and the cavity 54 which is connected with the exhaust port through passage 55, and brings uncovered port 62 into partial registration with passage 32. Fluid under pressure then flows from the auxiliary reservoir 7 to the brake cylinder 9, through port 62 and passage and pipe 32.

At the same time, the first movement of the auxiliary slide valve 17, connects two ports 63 and 64 in the main slide valve 16, through cavity 65 in the auxiliary slide valve 17, and the movement of the main slide valve 16 brings port 63 to register with port 66 in the slide valve seat, and port 64 with port 67. Consequently, the fluid in chamber 27 flows through ports 66, 63, 65, 64 and 67, thence around the quick action piston 24, which fits loosely in its cylinder, to chamber 31 and to the brake cylinder.

When the pressure in chamber 27 has reduced below the brake pipe pressure remaining in chamber 68, the check valve 28 is raised and allows brake pipe fluid to flow past the check valve and through the ports 66, 63, 65, 64 and 67 to the brake cylinder. The size of these ports is so proportioned that the flow of fluid from the brake pipe to the top of the quick action piston 26, is not sufficient to force the piston 26 downward and thus cause an emergency application.

Since the piston chamber 33 of the quick service valve device 10 is connected to the auxiliary reservoir 7, the pressure of the fluid in said chamber reduces as the fluid flows from the auxiliary reservoir to the brake cylinder in applying the brakes.

When the reduction of the pressure of the fluid in piston chamber 33 approaches equalization with the reduced brake pipe pressure in valve chamber 36, on the opposite side of the piston 35, the spring stop 40 moves the piston 35 and the slide valve 38 to the left toward release position.

The movement of the slide valve 38 to the left causes the passage 60 to be lapped, so that communication from the brake pipe to the atmosphere is cut off, thus preventing the further venting of fluid from the brake pipe.

In this way the quick service valve device 10 returns to release position immediately after an application of the brakes is initiated, and should further reductions in brake pipe pressure be effected in applying the brakes, the quick service valve device 10 will be in position to cause further local reductions in brake pipe pressure in the manner above described.

If, for any reason, a particular triple valve device should happen to be more sensitive to movement than the quick service valve device, the quick service action of the triple valve device, as above described, will be effective to produce quick service venting of fluid from the brake pipe, so that even though the operation of the quick service valve device should be suppressed, quick service action will still be obtained by operation of the triple valve device.

Due to the larger sized piston and the small slide valve 38, the quick service valve device 10 operates on a lesser differential of pressures than is required to operate the triple valve device 8 to effect a service application of the brakes. The operation of the quick service valve device thus hastens the operation of the local triple valve device, and also hastens the operation of the quick service valve device on the car following, so that a quick serial reduction in brake pipe pressure is propagated throughout the train in advance of the serial movement of the triple valve devices to service application position.

Fluid continues to flow from the auxiliary reservoir 7 through port 62 and passage 32 to the brake cylinder 9, until the pressure in the valve chamber 18 becomes enough less than that of the brake pipe to cause piston 14 and auxiliary slide valve 17 to move to the right until the shoulder 72 on the piston stem strikes the left-hand end of the main slide valve 16.

As the friction of the piston 14 and auxiliary slide valve 17 is much less than that of the main slide valve 16, the difference in pressure which will move the piston and auxiliary slide valve, will not be sufficient to also move the main slide valve, consequently, the piston stops in the position in which the auxiliary slide valve 17 blanks the port 62, thus cutting off any further flow of fluid from the auxiliary reservoir to the brake cylinder. In this position, the auxiliary slide valve 17 also blanks the port 63, thus preventing further flow of fluid from the brake pipe through the quick service ports. Consequently, no further change in fluid pressure can occur, since all ports are lapped.

If it is desired to make a heavier application, a further reduction of brake pipe pressure is made, and the operation of the valve devices described above repeated, until the auxiliary reservoir and brake cylinder pressures become equal.

The cut-out valve device 80 remains in the position in which passage 60 is connected to the atmospheric port 89, as shown in the drawing, so long as the auxiliary reservoir pressure exceeds the brake cylinder pressure.

If, however, the auxiliary reservoir pressure should substantially equalize into the brake cylinder, as would be the case in effecting an emergency application of the brakes, or in case of an over reduction in brake pipe pressure, then the spring 86 will operate to shift the piston 83 and slide valve 85 to the left, so that communication from passage and pipe 60 to the atmospheric port 89 is cut off.

It will now be evident that although the brake pipe is open to passage 60 when the quick service valve device is shifted in effecting an emergency application of the brakes or in case of an over reduction in brake pipe pressure, the passage 60 being cut off from the atmospheric port 89, the pressure may be readily restored in the brake pipe in releasing the brakes after an emergency application or after an over reduction in brake pipe pressure.

When it is desired to release the brakes, the brake pipe pressure is increased in the usual way, which consequently increases the pressure of fluid in piston chamber 12 of the triple valve device 8 and in valve chamber 36 of the quick service valve device 10, so that the piston 14 is moved to the right toward its release position, while the piston 35 is moved toward the left.

In the movement of the quick service valve piston 35 to the left, said piston compresses the spring stop 39 and the slide valve 38 is moved to the position in which the passage 56 is uncovered. Fluid at brake pipe pressure then flows from the valve chamber 36, through passage 56 to chamber 46 within the seat rib 44. With serial release reservoir pressure in chamber 45, brake pipe pressure in chamber 46, and auxiliary reservoir pressure in chamber 42, the diaphragm 41 will be moved away from the seat rib 44, compressing the spring 43, since the auxiliary reservoir pressure in chamber 42 will be lower than the brake pipe pressure, when the brakes are being released.

The movement of the diaphragm 41 away from the seat rib 44 connects the chambers 45 and 46, and the serial release reservoir 11 is connected to the brake pipe 6 by away of passage 50, past check valve 52, passage 53, chamber 45, chamber 46, through passage 69, past ball check valve 70, and passages 71 and 37, so that a sudden increase in brake pipe pressure is produced.

The movement of the triple valve piston 14 to the right acts to move the slide valves 16 and 17 toward release position until the piston stem strikes the spring-pressed stop 21. In this position the brake cylinder 9 is connected to atmosphere, by way of pipe and passage 32, valve cavity 54, and atmospheric passage 55, and the auxiliary reservoir 7 is recharged with fluid under pressure from the brake pipe, through the feed groove 19, in the same manner as the equipment is initially charged.

If, however, the brake pipe pressure builds up more rapidly than the auxiliary reservoir can recharge, due to the inshot of fluid from the serial release reservoir 11, the excess of pressure in piston chamber 12 over that in the auxiliary reservoir will cause the piston 14 to compress retarding spring 22, and move the triple valve parts further toward the right to the retarded release position.

Cavity 54 in the main slide valve 16 now connects passage 32, with the atmospheric passage 55, and the brakes will release, but as the small tail port extension 73 of cavity 54 is over the exhaust passage 55, the discharge of fluid from the brake cylinder to the atmosphere is quite slow, thereby retarding the release of the brakes.

Although the triple valves near the front end of the train may commence to release before those in the rear, the exhaust of fluid from the brake cylinder in retarded release position is sufficiently slow to hold back the release of the brakes at the front end of the train long enough to insure a practically simultaneous release of the brakes on the train as a whole. This permits of releasing the brakes on very long trains without danger of a severe shock or break-in-two.

When the auxiliary reservoir pressure is built up to a sufficient degree, the spring stop 39 returns the piston 35 and the slide valve 38 of the quick service valve device 10 to release position.

It will also be noted that when the brakes are being released, the quick service valve device 10 operates to produce a local increase in brake pipe pressure which is effective in hastening or accelerating the movement of the triple valve associated therewith to release position. In this manner the return of the triple valve on each car of a train equipped with a quick service valve device will be more rapid, than would otherwise be the case, thus insuring a quick release of the brakes.

The construction of the quick service valve device is such that if the brake pipe pressure varies at less than a service rate, the feed groove of the triple valve device will maintain the brake pipe and auxiliary reservoir pressures substantially in balance, so that no differential of pressures is set up on the piston 35. If the brake pipe pressure is reduced at a service rate, the piston 35 will promptly move, and the first movement will cause the small slide valve 38 to move and open a relatively large port for venting fluid from the brake pipe to the atmosphere, so that a quick and effective venting of fluid from the brake pipe takes place, which is rapidly propagated throughout the train.

The quick service venting continues so long as the triple valve device remains in service application position, since the lapping of the quick service valve device depends upon the substantial equalization of the auxiliary reservoir and brake pipe pressures.

The quick service venting by the quick service valve device is also effective in making an emergency application of the brakes, and therefore serves to accelerate quick action in emergency applications.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a valve device operated upon a reduction in brake pipe pressure for effecting an application of the brakes, of a valve device operated upon effecting an application of the brakes for venting fluid from the brake pipe to the atmosphere and means operated upon effecting an emergency application of the brakes for cutting off communication through which said valve device vents fluid from the brake pipe.

2. In a fluid pressure brake, the combination with a brake pipe, an auxiliary reservoir, brake cylinder, and a valve device operated upon a reduction in brake pipe pressure for supplying fluid under pressure to the brake cylinder, of a valve device subject to the opposing pressures of the auxiliary reservoir and the brake pipe and operated upon a reduction in brake pipe pressure for venting fluid from the brake pipe to the atmosphere, and a valve device subject to the opposing pressures of the auxiliary reservoir and the brake cylinder for controlling communication through which said brake pipe vent valve device vents fluid from the brake pipe to the atmosphere.

3. In a fluid pressure brake, the combination with a brake pipe, an auxiliary reservoir, brake cylinder, and a valve device operated upon a reduction in brake pipe pressure for supplying fluid under pressure to the brake cylinder, of a valve device subject to the opposing pressures of the auxiliary reservoir and the brake pipe and operated upon a reduction in brake pipe pressure for venting fluid from the brake pipe to the atmosphere, and a valve device subject to the opposing pressures of the auxiliary reservoir and the brake cylinder and operated upon a substantial equalization of the auxiliary reservoir and brake cylinder pressures for cutting off communication through which said brake pipe vent valve device vents fluid from the brake pipe to the atmosphere.

4. In a fluid pressure brake, the combination with a brake pipe, an auxiliary reservoir, brake cylinder, and a valve device operated upon a reduction in brake pipe pressure for supplying fluid under pressure to the brake cylinder, of a valve device subject to the opposing pressures of the auxiliary reservoir and the brake pipe and operated upon a reduction in brake pipe pressure for venting fluid from the brake pipe to the atmosphere, a valve device subject to the opposing pressures of the auxiliary reservoir and the brake cylinder for controlling communication through which fluid is vented from the brake pipe to the atmosphere, and a spring for actuating said valve device to close said communication upon substantial equalization of the auxiliary reservoir and brake cylinder pressures.

5. In a fluid pressure brake, the combination with a brake pipe, brake cylinder, auxiliary reservoir, and a triple valve device operated upon a reduction in brake pipe pressure for supplying fluid under pressure to the brake cylinder, of a valve device operated upon a reduction in brake pipe pressure for venting fluid from the brake pipe to the atmosphere and a valve device operated upon substantial equalization of the auxiliary reservoir and brake cylinder pressures for cutting off communication through which fluid is vented from the brake pipe.

In testimony whereof I have hereunto set my hand, this 20th day of August, 1930.

JOSEPH C. McCUNE.